United States Patent [19]
Oda et al.

[11] Patent Number: 5,487,221
[45] Date of Patent: Jan. 30, 1996

[54] JIG SAW

[75] Inventors: Zenichi Oda; Toshiyuki Kani, both of Anjo, Japan

[73] Assignee: Makita Corporation, Anjo, Japan

[21] Appl. No.: 385,836

[22] Filed: Feb. 9, 1995

[30] Foreign Application Priority Data

Feb. 10, 1994 [JP] Japan .................... 6-016677

[51] Int. Cl.$^6$ ........................ B23D 51/10; B27B 19/09
[52] U.S. Cl. ...................... 30/392; 30/394; 83/699.21
[58] Field of Search ................... 30/392–394, 369, 30/513, 337, 338; 83/699.21

[56] References Cited

U.S. PATENT DOCUMENTS

| | | | |
|---|---|---|---|
| 4,528,753 | 7/1985 | Kuhlmann et al. | 30/392 |
| 4,628,605 | 12/1986 | Clowers | 30/393 |
| 4,864,727 | 9/1989 | Chu | 30/394 |
| 5,165,173 | 11/1992 | Miller | 30/392 |
| 5,306,025 | 4/1994 | Langhoff | 30/392 X |

FOREIGN PATENT DOCUMENTS 544129  11/1992  European Pat. Off. .

*Primary Examiner*—Douglas D. Watts
*Attorney, Agent, or Firm*—Dennison, Meserole, Pollack & Scheiner

[57] ABSTRACT

A jig saw includes a housing and a drive shaft disposed within the housing and driven to perform a predetermined motion. A holder is mounted on the drive shaft and includes an operation member operable between a fixing position and a releasing position for fixing and releasing a saw blade, respectively. A cover is mounted on the housing and is movable between an open position and a closed position for uncovering and covering the holder, respectively. An interlocking mechanism is provided for interlocking between the operation member and the cover such that the operation member is moved from the fixing position to the releasing position when the cover is moved from the closed position to the open position.

10 Claims, 4 Drawing Sheets

JIG SAW

BACKGROUND OF THE INVENTION

1. Field of the Invention

The present invention relates to a jig saw.

2. Description of the Prior Art

EP 0544129 A1 discloses a jig saw having a chuck mechanism which provides convenience in mounting a saw blade on the jig saw and in removing the saw blade therefrom. The chuck mechanism has an operational cam formed on a tightening sleeve which is adapted to be rotated for mounting and removing the saw blade. A stopper edge is formed on a rotatable switching sleeve which is disposed outwardly of the tightening sleeve. The switching sleeve can be operable from the outside of a casing for rotating the tightening sleeve through engagement between the stopper edge and the operational cam of the tightening sleeve. With the chuck mechanism of this prior art, an operator can exchange the saw blade for a new one without directly touching the tightening sleeve, so that the operability of the chuck mechanism can be improved.

However, with the prior art jig saw, in order to attain such an improved operability, a separate switching sleeve must be mounted on the casing. Therefore, the jig saw is complicated in construction, and the manufacturing costs of the jig saw are increased.

SUMMARY OF THE INVENTION

It is, accordingly, an object of the present invention to provide a jig saw which is simple in construction and which enables an operator to exchange a saw blade without directly touching a holder to which the saw blade is fixed.

It is another object of the present invention to provide a jig saw which can be manufactured at lower cost.

It is a further object of the present invention which enables a saw blade to be easily exchanged.

According to the present invention, there is provided a jig saw comprising:

a housing;

a drive shaft disposed within the housing and driven to perform a predetermined motion;

a holder mounted on the drive shaft and having an operation member operable between a fixing position and a releasing position for fixing and releasing a saw blade, respectively;

a cover mounted on the housing and movable between an open position and a closed position for uncovering and covering the holder, respectively; and an interlocking mechanism for interlocking between the operation member and the cover such that the operation member is moved from the fixing position to the releasing position when the cover is moved from the closed position to the open position.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 1:
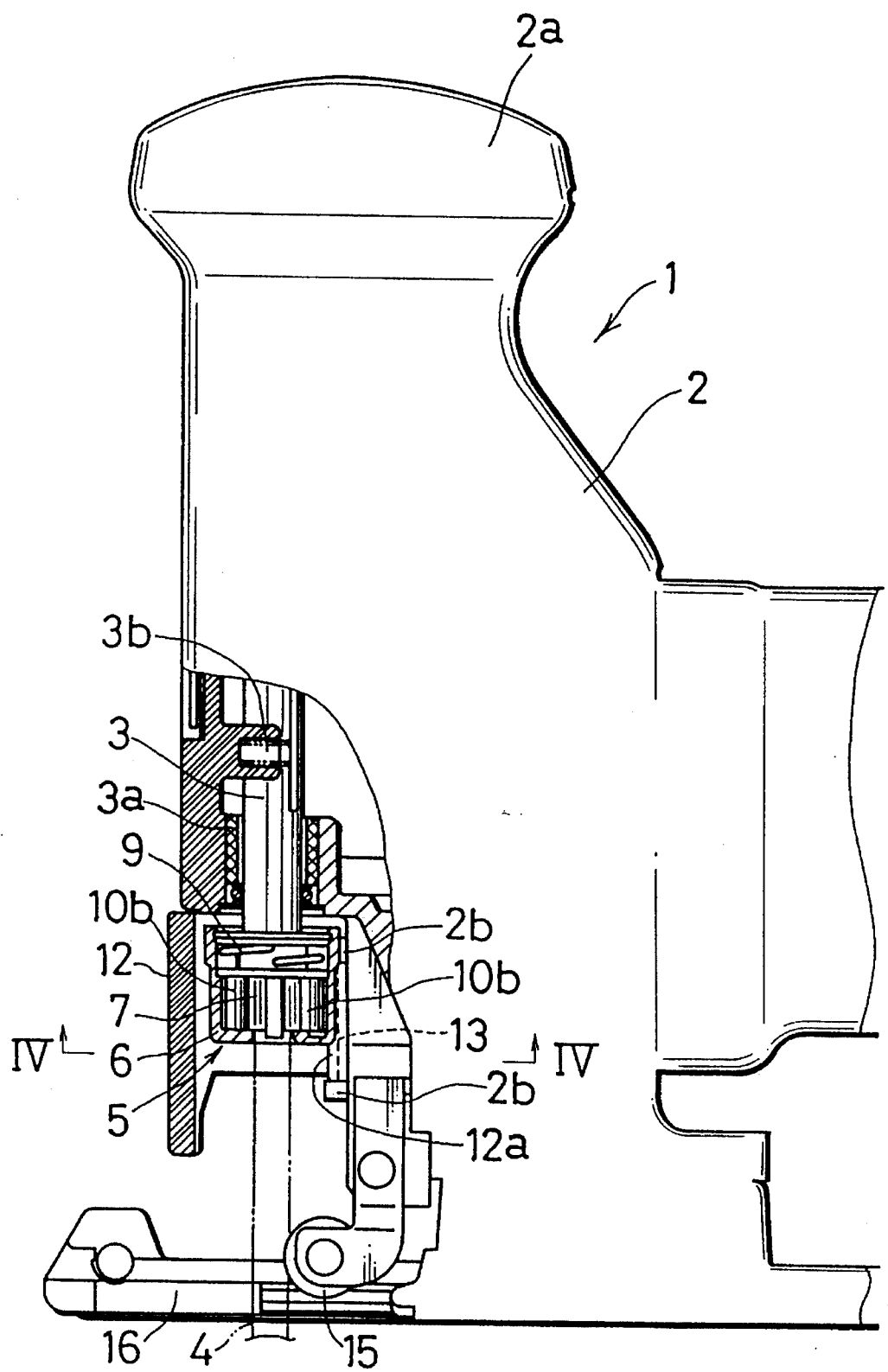
FIG. 1 is a side view, with a part broken away, of the essential parts of a jig saw according to an embodiment of the present invention.

Referring to FIG. 1, a front portion of a jig saw 1 according to this embodiment is shown with a part broken away. The jig saw I has a housing 2 which is constricted to form an upper grip portion 2a to be grasped by one hand of an operator. The housing 2 has a rear portion (not shown) which has a cylindrical configuration and is adapted to be grasped by the other hand of the operator. A motor (not shown) is accommodated within the rear portion of the housing 2.

A drive shaft 3 is disposed within a front end of the housing 2 at a position downwardly of the grip portion 2a. The drive shaft 3 is connected to the motor via an orbital motion mechanism (not shown), so that the drive shaft 3 is reciprocally moved both in a vertical direction and in forward and rearward directions by predetermined distances, respectively. Such an orbital motion mechanism is well known in the art, and therefore, its description will be omitted. A pair of support members 3a (only the lower one is shown in the drawing) support the drive shaft 3 so as to permit the orbital motion of the drive shaft 3.

Figure 2:
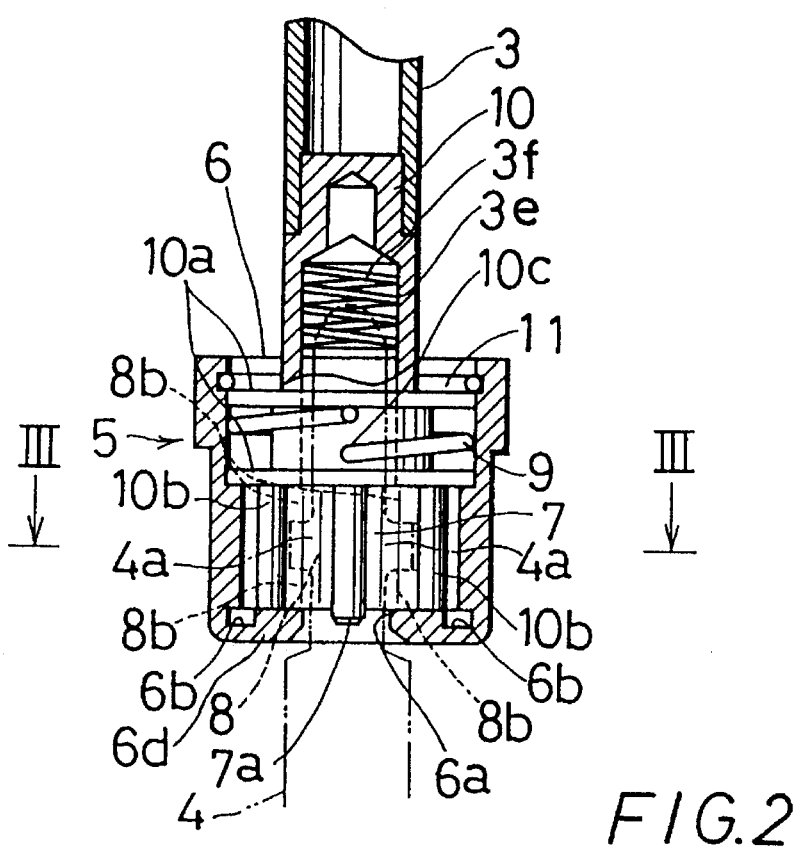
FIG. 2 is a vertical sectional view of a holder of the jig saw.
Figure 3:
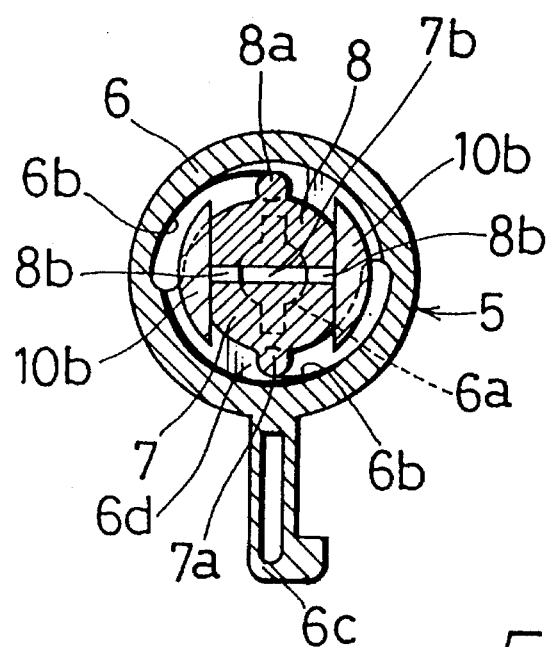
FIG. 3 is a sectional view taken along line III—III in FIG. 2.

A holder 5 is mounted on a lower end of the drive shaft 3 for removably mounting an upper end of a saw blade 4 thereon. As shown in FIGS. 2 and 3, the holder 5 includes a support rod 10, a pair of holder blocks 7 and 8 and an operation member 6. The support rod 10 is fixed to the lower end of the drive shaft 3 and extends coaxially therewith. The holder blocks 7 and 8 are disposed within the operation member 6.

The support rod 10 has a pair of flange portions 10a which are spaced from each other in an axial direction of the support rod 10 and extend in parallel to each other. A torsion coil spring 9 is interposed between the flange portions 10a. One end of the torsion coil spring 9 is fixedly inserted into an engaging hole 10c formed in the support rod 10. The other end of the torsion coil spring 9 is fixed to the operation member 6. Thus, the operation member 6 is rotatable about an axis of the support rod 10 or an axis of the drive shaft 3 while it is normally biased by the torsion coil spring 9 in a counterclockwise direction in FIG. 3. A pair of holder protrusions 10b are formed on a lower surface of the lower flange portion 10. The holder protrusions 10b are spaced from each other by a predetermined distance. The holder blocks 7 and 8 are disposed between the holder protrusions 10b such that they are movable in a direction toward and away from each other within a space between holder protrusions lob. Guide protrusions 7a and 8a are formed on outer surfaces of the holder blocks 7 and 8 and extend downwardly therefrom, respectively.

The operation member 6 is operable to be rotated for removing the saw blade 4 and for mounting a new saw blade 4 on the holder 5. The operation member 6 has a substantially cylindrical configuration and surrounds the support rod 10 and the support blocks 7 and 8. A stopper ring 11 is mounted on an inner wall of the operation member 6 and is rested on the upper flange portion 10a of the support rod 10 so as to prevent axial movement of the operation member 6 relative to the support rod 10. The operation member 6 has a bottom 6d in which an insertion hole 6a is formed for inserting the saw blade 4 into the operation member 6. A pair of helical guide recesses 6b are formed on an upper surface of the bottom 6d and extend in a circumferential direction of the operation member 6 by an angle of 90°, respectively. The guide recesses 6b are positioned symmetrically with respect to the axis of the operation member 6. The guide protrusions 7a and 8a of the holder blocks 7 and 8 are in engagement with their corresponding guide recesses 6b, respectively. As is best shown in FIG. 3, each of the guide recesses 6b extends outwardly and circumferentially in a counterclockwise direction from a position adjacent the insertion hole 6a, so that the holder blocks 7 and 8 are moved away from each other when the operation member 6 is rotated in the clockwise direction in FIG. 3 against the biasing force of the torsion coil spring 9. When the operation member 6 has been rotated by an angle of 90°, the distance between the holder blocks 7 and 8 becomes maximum, so that an upper portion of the saw blade 4 can be inserted between the holder blocks 7 and 8 through the insertion hole 6a. When the rotational force applied to the operation member 6 is then released, the operation member 6 is rotated in the counterclockwise direction by the force of the torsion coil spring 9, and the holder blocks 7 and 8 move toward each other, so that the upper portion of the saw blade 4 can be clamped between the holder blocks 7 and 8. Here, as shown in FIGS. 2 and 3, engaging protrusions 8b are formed on one side of the engaging block 8 confronting the engaging block 7 and are positioned at four corners thereof. On the other hand, an engaging protrusion 7b is formed on one side of the engaging block 7 confronting the engaging block 8. The engaging protrusion 7b is insertable between two of the engaging protrusions 8b positioned on one end of the engaging block 7 in the diametrical direction and the other two of the engaging protrusions 8b positioned on the other end. The upper portion of the saw blade 4 has stopper protrusions 4a formed on both sides thereof. Therefore, when the upper portion of the saw blade 4 is clamped between the engaging blocks 7 and 8, the saw blade 4a is fixed in position, with each stopper protrusion 4a positioned between its corresponding pair of the engaging protrusions 8b.

As described above, the holder blocks 7 and 8 are moved away from each other so as to permit insertion of the saw blade 4 therebetween when the operation member 6 is rotated in the clockwise direction in FIG. 3 (hereinafter called "saw blade releasing direction") against the biasing force of the torsion coil spring 9. On the other hand, when the rotational force applied to the operation member 6 is released, the operation member 6 is rotated in the counterclockwise direction (hereinafter called "saw blade fixing direction") by the biasing force of the torsion coil spring 9, so that the holder blocks 7 and 8 are moved toward each other so as to clamp the upper portion of the saw blade 4 therebetween. Consequently, the saw blade 4 is fixed to the holder 6 or is mounted on the jig saw 1.

As shown in FIG. 2, the support rod 10 has an axial hole 3e for receiving the upper end of the saw blade 4. A compression coil spring 3f is disposed within the axial hole 3e for applying a biasing force in a downward direction to the saw blade 4 fixed to the holder 5, so that the saw blade is pushed downwardly by the compression coil spring 3f when the operation member 6 is rotated in the saw blade releasing direction. Further, when the saw blade 4 is broken within the holder 5, the broken pieces of the saw blade 4 remaining in the holder 5 can be pushed away from the holder 5 by the compression coil spring 3f, so that the broken pieces can be easily removed.

Figure 6:
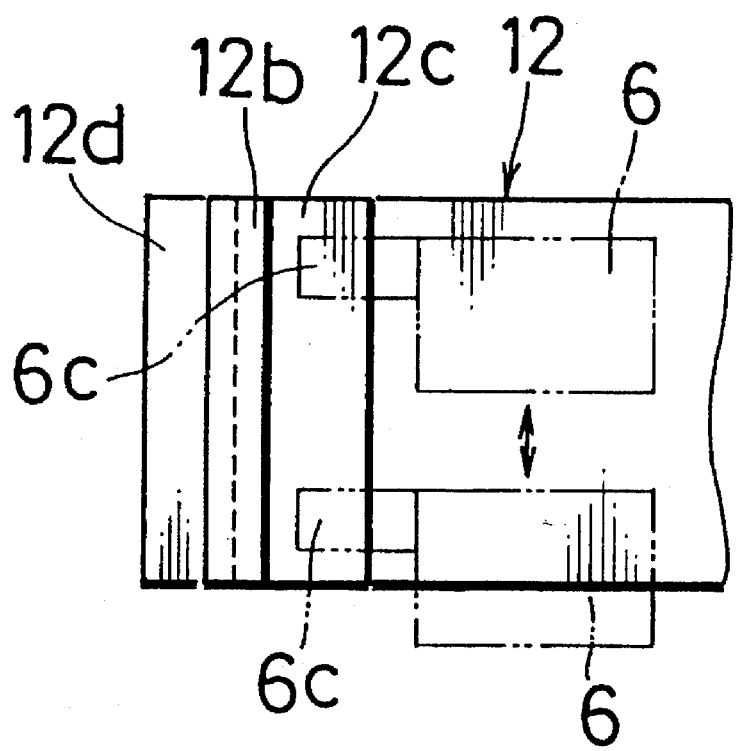
FIG. 6 is a view of the cover taken in the direction of the arrow C in FIG. 5.

As shown in FIGS. 3 and 6, a vertical flat plate-like protrusion 6c is formed integrally with the operation member 6 and extends outwardly therefrom in a radial direction. The protrusion 6c has a hook-like forward end bent in the counterclockwise direction in FIG. 3.

Figure 4:
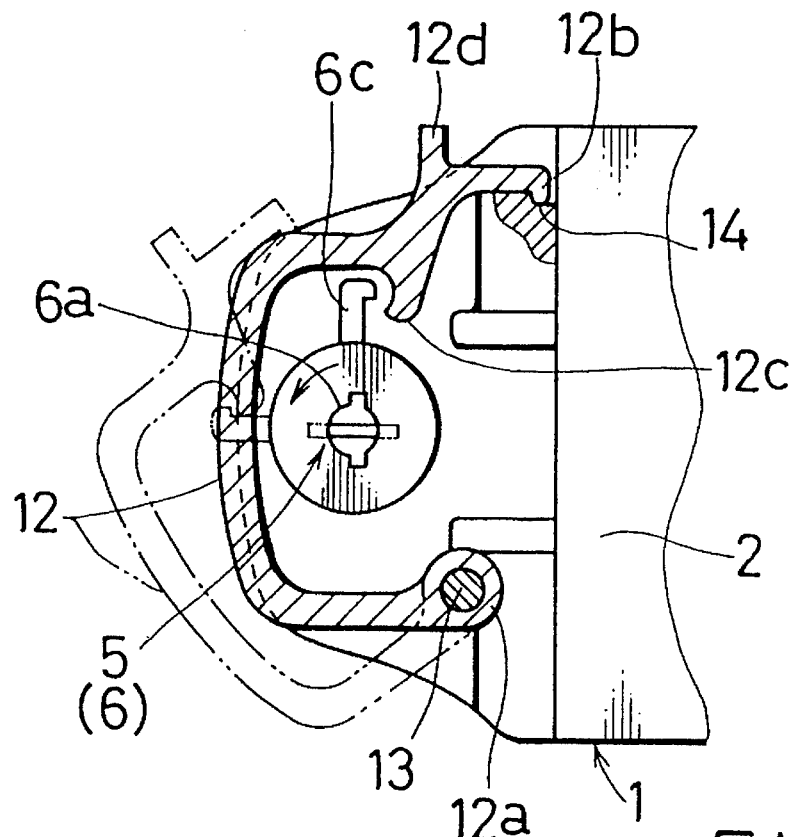
FIG. 4 is a sectional view taken along line IV—IV in FIG. 1.
Figure 5:
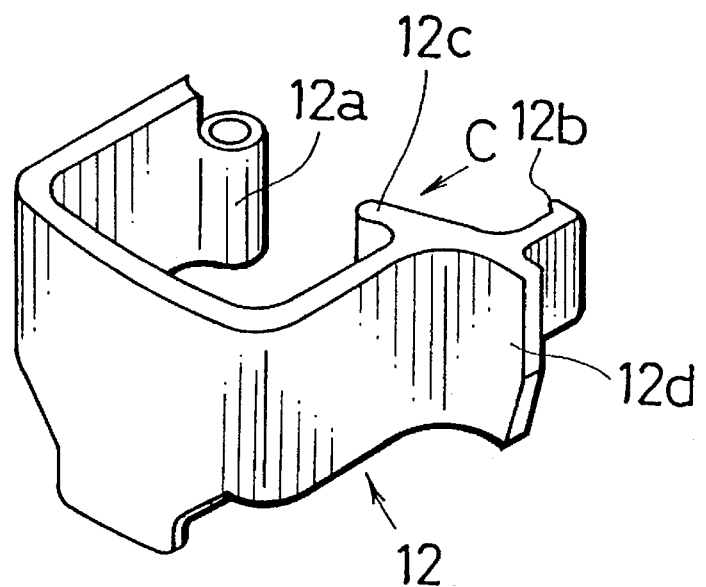
FIG. 5 is a perspective view of a cover of the holder.

Meanwhile, with the jig saw 1 of this embodiment, a cover 12 is mounted on the housing 2 so as to cover the holder 5 at the front side and left and right sides thereof as shown in solid lines in FIG. 4. As shown in FIGS. 4 and 5, the cover 12 is a single member having substantially U-shaped configuration. The cover 12 has both ends on which a cylindrical support portion 12a and an engaging claw 12b are formed, respectively. An engaging tab 12c and an operation tab 12d are formed integrally with the cover 12 at positions adjacent the engaging claw 12b, respectively. The engaging tab 12c extends inwardly of the cover 12 and has a curved forward end. The operation tab 12d extends outwardly of the cover 12. On the other hand, as shown in FIG. 1, a pair of support portions 2b are formed on a front surface of the housing 2 and are spaced from each other by a predetermined distance in the vertical direction. With the support portion 12a of the cover 12 positioned between the support portions 2b, a support pin 13 is inserted through the support portion 12a and the support portions 2b, so that the cover 12 can be pivoted in a cantilever manner around the support pin 13 which has an axis parallel to the saw blade 4 or parallel to the drive shaft 3. Thus, the engaging claw 12b is formed on a free end of the cover 12. With such a pivotal movement of the cover 12, the cover 12 can be moved to uncover the holder 5 and can be moved to cover the holder 5. As shown in FIG. 4, an engaging portion 14 is formed on the housing 2 at a position where the engaging claw 12b confronts when the cover 12 is in a closed position, so that the engaging claw 12b is brought into snap-in engagement with the engaging portion 14, and so that the cover 12 can be held in the closed position. The operation tab 12 serves as an operation knob which is adapted to be held by fingers of the operator for opening and closing the cover 12.

As shown in FIGS. 4 and 5, the engaging tab 12c has a flat plate-like configuration. The position of the engaging tab 12c relative to the cover 12 is determined such that the engaging tab 12c is positioned rearwardly (or in a pivotal direction of the cover 12 for closing the same) of the protrusion 6c of the holder 6 when the cover 12 is in the closed position. The protruding length of the engaging tab 12c from the cover 12 is determined to be sufficient to engage the protrusion 6c when the cover 12 is opened. Thus, when the operator opens the cover 12 with the operation tab 12d held by his fingers, the engaging tab 12c abuts on the protrusion 6c and then pushes the protrusion 6c to rotate the operation member 6 in the saw blade releasing direction. Since the biasing force of the torsion coil spring 9 is applied to the cover 12 through abutment between the engaging tab 12c and the protrusion 6c during the opening operation, the operator is required to pivot the cover 12 against the biasing force of the torsion coil spring 9.

When the operator releases his fingers from the operation tab 12d during the opening operation, the cover 12 is pivoted toward the closed position by the biasing force of the torsion coil spring 9. More specifically, when the operator releases his fingers from the operation tab 12d, the operation member 6 which has been rotated in the direction for removing saw blade is rotated in the saw blade fixing direction by the biasing force of the torsion coil spring 9, and the engaging tab 12c is pushed by the protrusion 6c by such rotation of the operation member 6 in the saw blade fixing direction to cause pivotal movement of the cover 12 toward the closed position. Here, as shown in FIG. 4, when the cover 12 is in the closed position, a gap is created between the engaging tab 12c and the protrusion 6c of the operation member 6. Thus, the biasing force of the torsion coil spring 9 to return the cover 12 toward the closed position is no more applied to the cover 12 when the cover 12 is pivoted to reach a predetermined position just before the closed position. Therefore, in order to completely close the cover 12, the operator pushes the cover 12 toward the closed position, so that the engaging claw 2b is brought into snap-in engagement with the engaging portion 14 through resilient deformation of the cover 12. However, by determining the biasing force of the torsion spring 9 to have a great value, the engaging claw 2b may automatically engage the engaging portion 14 by the inertia force of the cover 12. The gap between the engaging tab 12c and the protrusion 6c created in the closed position of the cover 12 serves to prevent any interference between the engaging tab 12c and the protrusion 6c when the jig saw 1 is operated to reciprocally move the holder 5 both in the vertical direction and in the forward and rearward directions for a cutting operation. Therefore, the jig saw 1 can be operated without any problems.

Here, when the motor has been stopped, the holder 5 is stopped in a random position in its orbit of movement, and therefore the protrusion 6c is also stopped in a random position, especially in the vertical position. However, as shown in FIG. 6, the engaging tab 12c is long in the vertical direction which is sufficient to cope with the vertical stroke of the protrusion 6c. Therefore, the protrusion 6c can engage the engaging tab 12c irrespective of the vertical position of the protrusion 6c when the motor is stopped.

When the cover 12 has been pivoted to a maximum open position as indicated by chain lines in FIG. 4, the operation member 6 reaches a maximum rotational position in the saw blade releasing direction, so that the holder blocks 7 and 8 are sufficiently spaced from each other for receiving the upper portion of new saw blade 4.

When the upper portion of the saw blade 4 is inserted between the holder blocks 7 and 8 and the cover 12 is pivoted from the maximum open position to the closed position as described above, the upper portion of the saw blade 4 is clamped between the holder blocks 7 and 8, and each stopper protrusion 4a of the saw blade 4 is held between its corresponding pair of the engaging protrusions 8b as described above. Thus, the saw blade 4 is fixed to the holder 5 not to be accidentally removed. The closed position of the cover 12 is maintained through engagement of the engaging claw 12b with the engaging portion 14.

As shown in FIG. 4, the axis of the support pin 13 or the pivotal axis of the cover 12 is displaced from the rotational axis of the operation member 6 by a great distance such that, through engagement between the engaging tab 12c and the protrusion 6c, the operation member 6 receives a pushing force in the forward direction as well as the rotational force from the cover 12. The hook-like forward end of the engaging tab 12c and the curved forward end of the protrusion 6c cooperate to produce such a pushing force in the forward direction. Here, as shown in FIG. 1, the drive shaft 3 is normally biased by a spring 3a in a rearward direction, so that the holder 5 is positioned in its rearmost position when the motor is not driven. Thus, as the cover 12 is opened, the holder 5 is moved forwardly against the biasing force of the spring 3a, so that the position of the insertion hole 6a of the holder 5 is shifted forwardly. On the other hand, as the cover 12 is closed by the biasing force of the torsion coil spring 9, the operation member 6 is rotated in the saw blade fixing direction and the holder 5 returns to the rearmost position by the biasing force of the spring 3b.

Further, as shown in FIG. 2, a backup roller 15 is mounted on the housing 2 via a bracket 15 for the purpose of backup support of the saw blade 4 against the force applied to the saw blade 4 during the cutting operation of a work. A base 16 is mounted on the bottom of the housing 2, so that the jig saw 1 is placed on the work during the cutting operation with the base 16 abutted on the work.

As described above, with the jig saw 1 of this embodiment, the operation member 6 of the holder 5 is rotated in the saw blade releasing direction when the operator opens the cover 12 against the biasing force of the torsion spring 9 of the holder 5. Therefore, by simply opening the cover 12, the saw blade 4 can be removed from the holder 5 and a new saw blade 4 can be inserted into the holder 5. After the new saw blade 4 is inserted between the holder blocks 7 and 8 through the insertion hole 6a, the operator releases the force applied to the operation tab 12d. Since the rotational force is no more applied to the operation member 6 in the saw blade releasing direction, the operation member 6 is rotated in the saw blade fixing direction by the biasing force of the torsion coil spring 9. Then, the cover 12 is moved toward the closed position through abutment between the engaging tab 12c and the protrusion 6c. After the cover 12 is returned to the position adjacent the closed position by the biasing force of the torsion coil spring 9, the operator applies the pushing force to the operation tab 12d, so that the engaging claw 12b is brought to engage the engaging portion 14 to maintain the closed position of the cover 12.

Thus, when the cover 12 is opened, a gap is created between the holder blocks 7 and 8 to enable removal of the saw blade 4 from the holder 5 and to enable insertion of a new saw blade 4. On the other hand, when the cover 12 is closed after insertion of the new saw blade 4 into the holder blocks 7 and 8, the operation member 6 is rotated in the saw blade fixing direction, so that the new saw blade 4 is fixed in position or the fixing operation of the new saw blade 4 is completed. This means that the operator can exchange the saw blade 4 for a new one without directly touching the holder 5. Normally, in this kind of jig saw 1, iron powder heated by cutting heat of a work or cutting lubricant oil is affixed to a holder during the cutting operation, and therefore, there is some possibility of the operator's hand being stained or suffering heat from the holder. However, with this embodiment, the operator is not required to directly operate the holder 5 for exchanging the holder 4, and therefore, the exchanging operation can be performed without caring about stains or heat from the holder 5.

More importantly, a cover is usually provided in this kind of jig saw for preventing cut chips from scattering or for preventing the operator from access to a saw blade during the cutting operation, and the cover 12 of this embodiment utilizes such a cover which is usually provided. Therefore, the jig saw 1 can be constructed without incorporating a separate member for operation of a holder as is provided in the prior art, so that the jig saw 1 is simple in construction and can be manufactured at lower cost.

Additionally, in the closed position, the cover 12 covers the holder 5 and the upper portion of the saw blade 4 at their front side and at both right and left side thereof, and therefore, the cover 12 can reliably perform its primary function to prevent scattering of the cutting chips and to prevent access of the operator to the holder 5 during the cutting operation. Particularly, unless the cover 12 is closed, the saw blade 4 may not be fixed in position and the cutting operation is impossible to perform. Therefore, such a primary function of the cover 12 is not hindered. Further, when the cover 12 is in the closed position, the gap is formed between the engaging tab 12 and the protrusion 6c, so that no interference is caused between the engaging tab 12 and the protrusion 6c during the reciprocal movement of the holder 5, and so that the jig saw 1 can be operated without any problems.

When the cover 12 is pivoted to be opened, in addition to the rotation of the operation member 6 in the saw blade fixing direction, the holder 5 is pulled forwardly (leftwardly in FIG. 1) by the cover 12, so that the new saw blade 4 can be easily mounted on the holder 5 without being hindered by the backup roller 15.

While the invention has been described with reference to a preferred embodiment, it is to be understood that modifications or variation may be easily made without departing from the spirit of this invention which is defined the appended claims.

What is claimed is:

1. A jig saw comprising:

a housing;

a drive shaft disposed within said housing and driven to perform a predetermined motion;

a holder mounted on said drive shaft and having an operation member operable between a fixing position and a releasing position for fixing and releasing a saw blade, respectively;

a cover mounted on said housing and movable between an open position and a closed position for uncovering and covering said holder, respectively; and interlocking means for interlocking between said operation member and said cover such that said operation member is moved from said fixing position to said releasing position when said cover is moved from said closed position to said open position.

2. The jig saw as defined in claim 1 wherein said cover in said closed position cooperates with said housing to cover substantially the whole holder in the circumferential direction so as to prevent access of an operator to said holder and so as to prevent scattering of cutting chips of a work during a cutting operation.

3. The jig saw as defined in claim 1 wherein said cover is pivotable about an axis which is in parallel to an axis of said drive shaft;

4. The jig saw as defined in claim 3 wherein said cover is mounted on said housing in a cantilever manner and has a free end detachably fixed to a corresponding part of said housing.

5. The jig saw as defined in claim 1 wherein said operation member is rotatably mounted on said drive shaft, and wherein said interlocking means is operable to rotate said operation member in response to movement of said cover between said open position and said closed position.

6. The jig saw as defined in claim 5 wherein said interlocking means includes a first engaging member disposed on said operation member and a second engaging member disposed on said cover, and wherein said operation member is rotated through engagement between said first and second engaging members when said cover is moved from said closed position toward said open position.

7. The jig saw as defined in claim 4 further including biasing means for normally biasing said operation member toward said fixing position, and wherein said operation member is movable from said fixing position to said releasing position against the biasing force of said biasing means when said cover is moved from said closed position to said open position.

8. The jig saw as defined in claim 5 wherein said engaging tab and said protrusion are spaced from each other when said cover is in said closed position, so that said first and second engaging members abut on each other when said cover is moved from said closed position toward said open position by a predetermined distance.

9. The jig saw as defined in claim 1 wherein:

said drive shaft is biased by drive shaft biasing means in a direction such that a rear edge of the saw blade mounted on said holder abuts on a backup member mounted on said housing; and said interlocking means is operable to move said holder against the biasing force of said drive shaft biasing means in a direction such that the rear edge of said saw blade is moved away from said backup member as said cover is moved from said closed position toward said open position.

10. The jig saw as defined in claim i wherein:

said operation member is rotatably mounted on said drive shaft;

said interlocking means includes a first engaging member disposed on said operation member and a second engaging member disposed on said cover and engageable with said first engaging member;

said cover is pivotally mounted on said housing in a cantilever manner and has a free end, said cover having a pivotal axis which is in parallel to an axis of said drive shaft; and said second engaging member is positioned adjacent said free end, so that said second engaging member is moved about and away from said holder as said cover is moved from said closed position toward said open position.

* * * * *